United States Patent [19]
Katz

[11] Patent Number: 6,098,250
[45] Date of Patent: *Aug. 8, 2000

[54] FASTENING DEVICE

[76] Inventor: Harry S. Katz, 785 Pleasant Valley Way, West Orange, N.J. 07052

[ * ] Notice: This patent is subject to a terminal disclaimer.

[21] Appl. No.: 08/318,986

[22] Filed: Oct. 6, 1994

[51] Int. Cl.⁷ .............................. A45F 5/00; B65D 63/00
[52] U.S. Cl. .............................. 24/16 PB; 24/3.3; 24/3.6
[58] Field of Search .................................. 24/16 PB, 3.3, 24/3.13, 306

[56] References Cited

U.S. PATENT DOCUMENTS

| | | | |
|---|---|---|---|
| 370,239 | 9/1887 | Brombacher | 24/16 PB |
| 3,318,354 | 5/1967 | Borisof | 24/16 PB |
| 3,438,095 | 4/1969 | Evans | 24/16 PB |
| 3,702,203 | 11/1972 | Oltmanns | 24/16 PB |
| 4,380,101 | 4/1983 | Joubert et al. | 24/16 PB |
| 5,083,346 | 1/1992 | Orton | 24/16 PB |
| 5,087,118 | 2/1992 | Gill | 24/3.3 |

FOREIGN PATENT DOCUMENTS 1056740  1/1967  United Kingdom ................. 24/16 PB Primary Examiner—Victor N. Sakran
Attorney, Agent, or Firm—Law Offices of Mitchell P. Novick

[57] ABSTRACT

A fastening device [or belt] comprising a strip of colored plastic molded in a desired shape with one surface being substantially flat. At both ends of the strip are a plurality of loops. The loops may be interlocked to surround and secure an object, or the loops may be directly attached to the object to be secured. Two strips may be interlocked with each other to create a larger strip. [Also claimed are methods for making this fastening device or belt by open mold or injection molding processes.]

9 Claims, 6 Drawing Sheets

FASTENING DEVICE

BACKGROUND OF THE INVENTION

1. Field of the Invention

This invention relates to fastening and securing devices in industrial, clothing, and other applications, and, more specifically, to belts and strap-type fastening devices.

2. Description of the Prior Art

There are many industrial, clothing, and other applications which require the use of fastening and securing devices, such as, straps, belts, and ties. The prior art discloses variations of these devices in many different configurations and designs. Often, these devices require the use of an independent closure or buckling mechanism, which may or may not be permanently attached to the device. A well known example is the clothing belt. This belt comprises a strap of fabric, leather, or other material with a separate buckle typically made from plastic, metal, or wood. Usually, the buckle is semi-permanently attached to the strap.

Leather belts are very popular in the prior art. Nevertheless, leather is a material that could have limited availability and does not offer the potential for large scale automated production. Furthermore, leather, as with most types of materials for clothing belts, has limited potential for decoration or novel visual colors, textures, and cosmetic details.

In addition, many of the prior art closure devices are produced using labor-intensive processes. Consequently, these processes may result in relatively expensive or, alternatively, low-quality final products.

Another limitation of the prior art regards the modular creation of large belts from smaller pieces. One may be able to join two or more small belts together to form a larger belt, but the procedure is very awkward and the resulting belt may be difficult to maneuver.

Overall, the prior art closure devices do not lend themselves to wide flexibility in the manufacturing process and require separate buckling mechanisms.

SUMMARY OF THE INVENTION

A primary object of this invention is a fastening device or belt that contains an integral buckling mechanism.

Another object of this invention is a fastening device or belt that is of modular design.

Another object of this invention is a fastening device or belt which is of adjustable length.

Another object of this invention is a fastening device or belt that is strong while lightweight.

Another object of this invention is a fastening device or belt that is economical to produce, while retaining high quality.

Another object of this invention is a fastening device or belt that may be produced in a variety of colors, shapes, embossed patterns, and textures.

In short, this invention comprises a strip of transparent or colored plastic molded in a desired shape. At one end of the strip are a plurality of hooks; at the other end of the strip are a plurality of receptors. Moreover, one embodiment has similar ends that can function as either hook or receptor, thereby simplifying mold design and reducing mold cost. Molding can be done by open mold or injection molding processes.

DESCRIPTION OF PREFERRED EMBODIMENT

Figure 1:
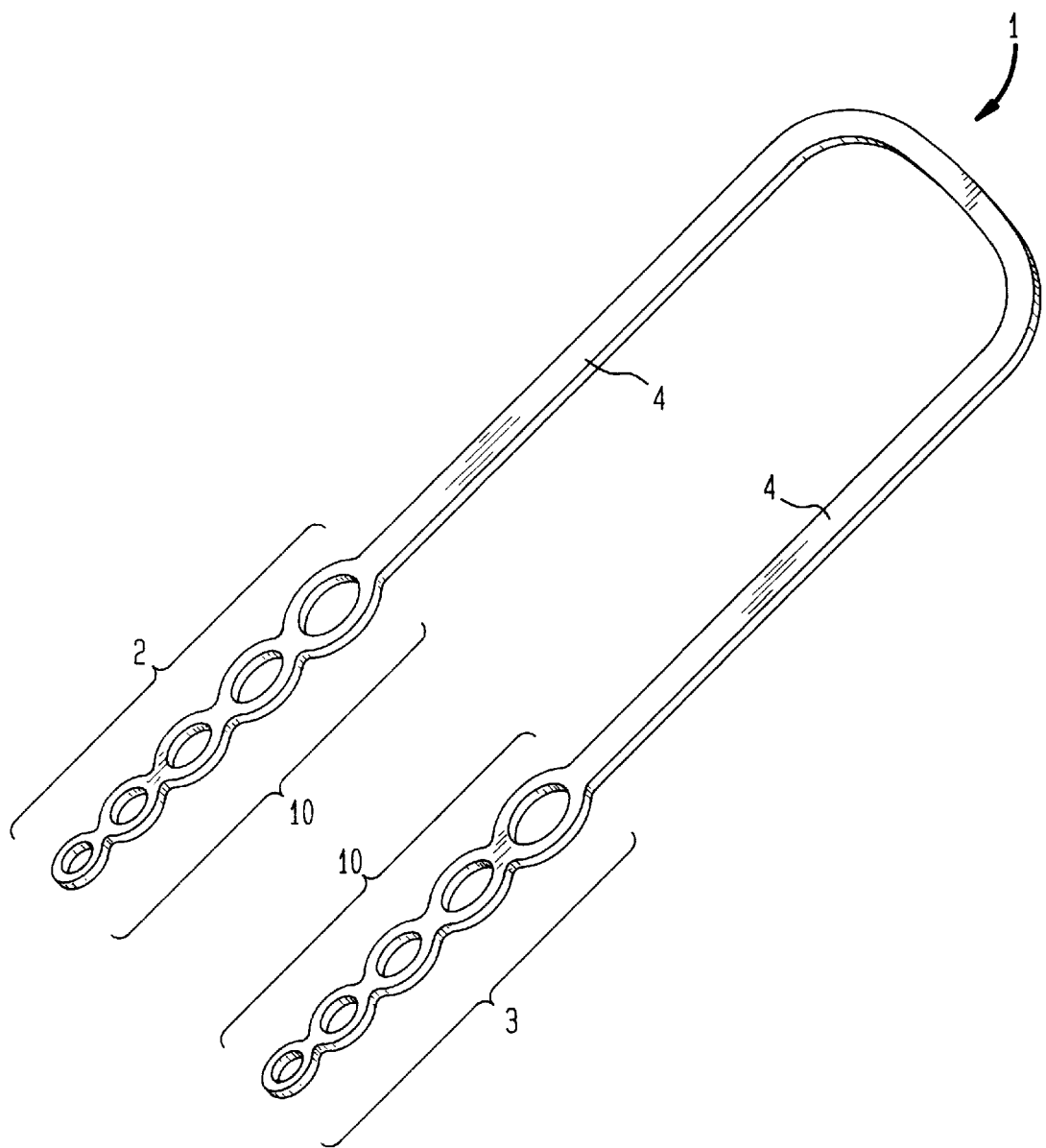
FIG. 1 is a perspective view of a fastening device or belt.
Figure 2:
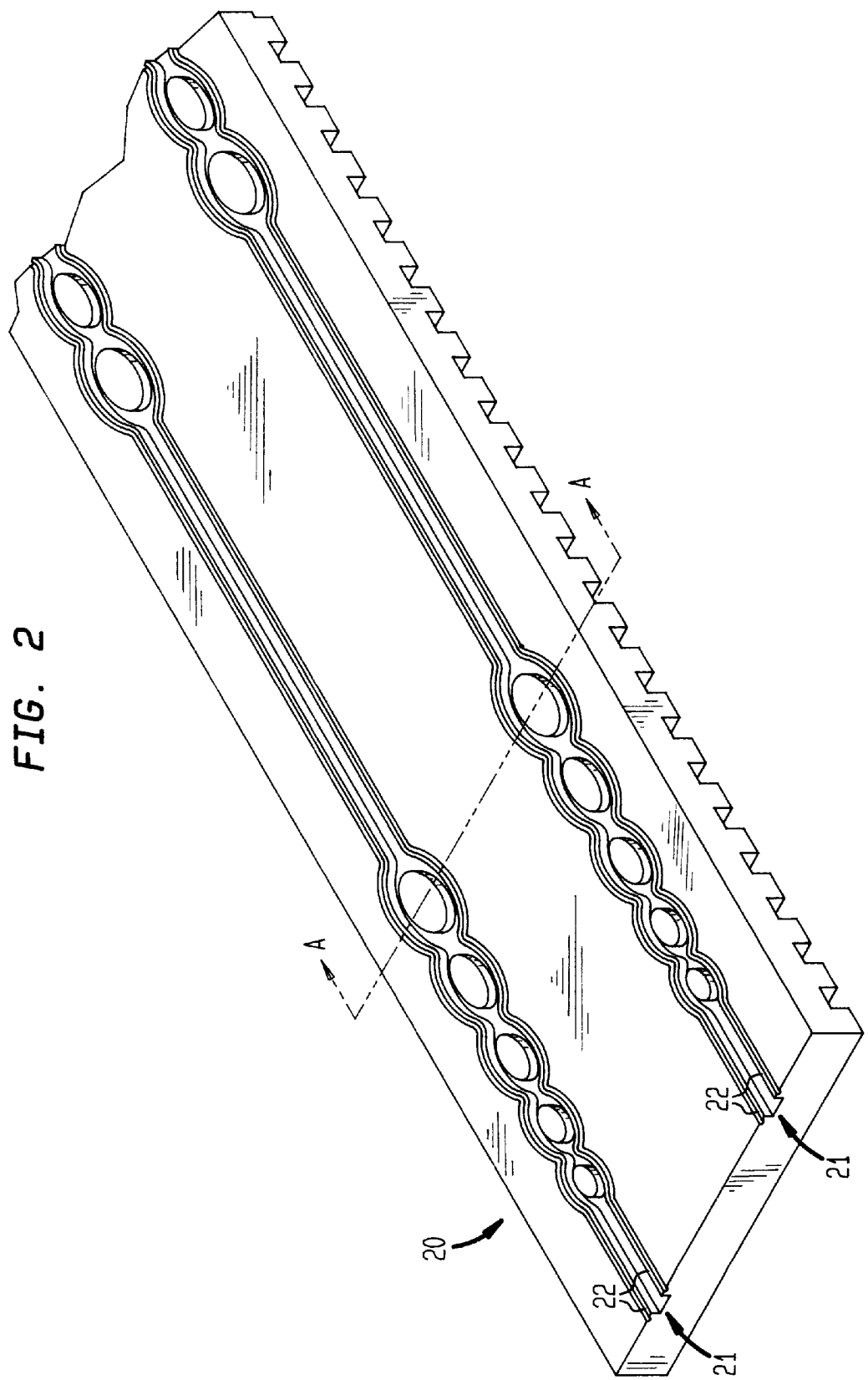
FIG. 2 is a mold for producing two of the fastening devices or belts shown in FIG. 1.
Figure 3:
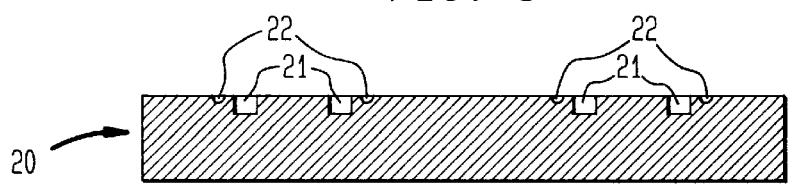
FIG. 3 is a cross-section of the mold shown in FIG. 2 taken at A—A.
Figure 4:
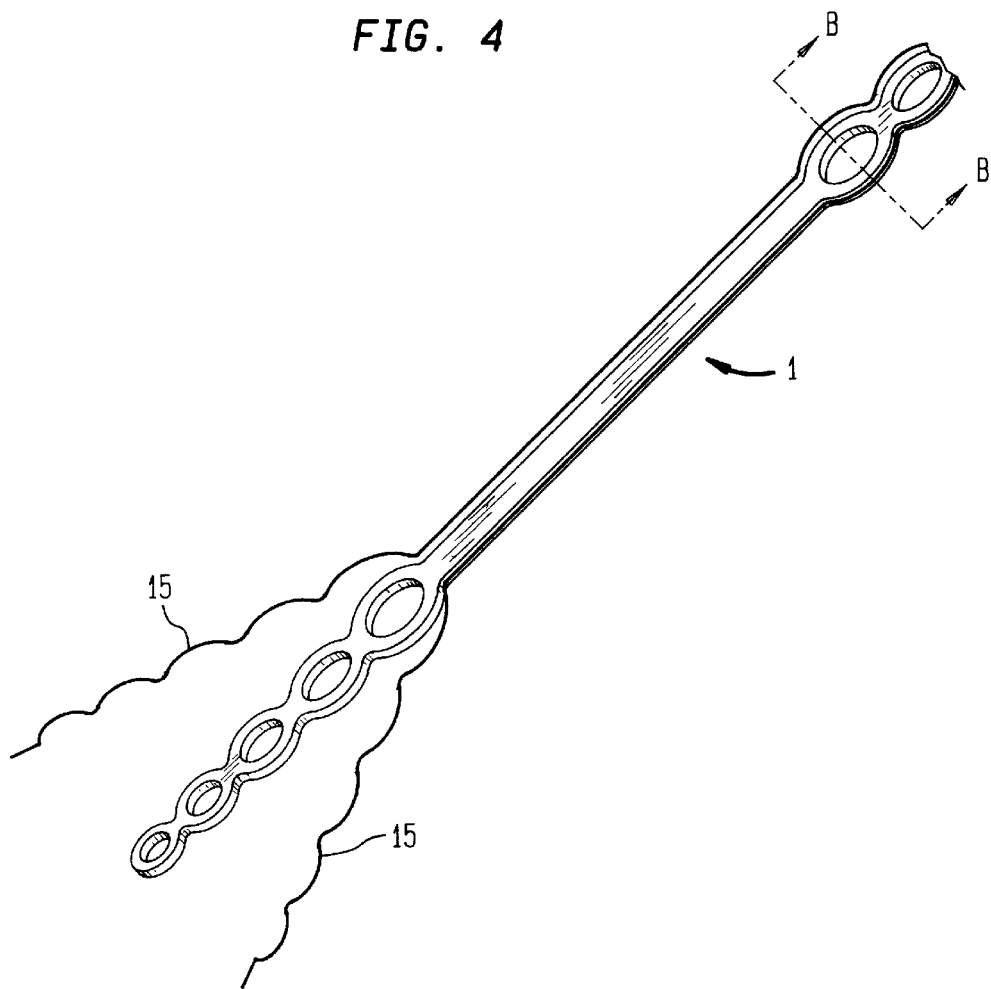
FIG. 4 is the fastening device or belt shown in FIG. 1 with the flash not completely removed.
Figure 5:
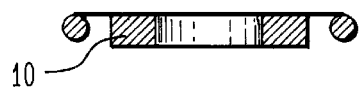
FIG. 5 is a cross-section of the fastening device or belt shown in FIG. 4 taken at B—B.
Figure 6:
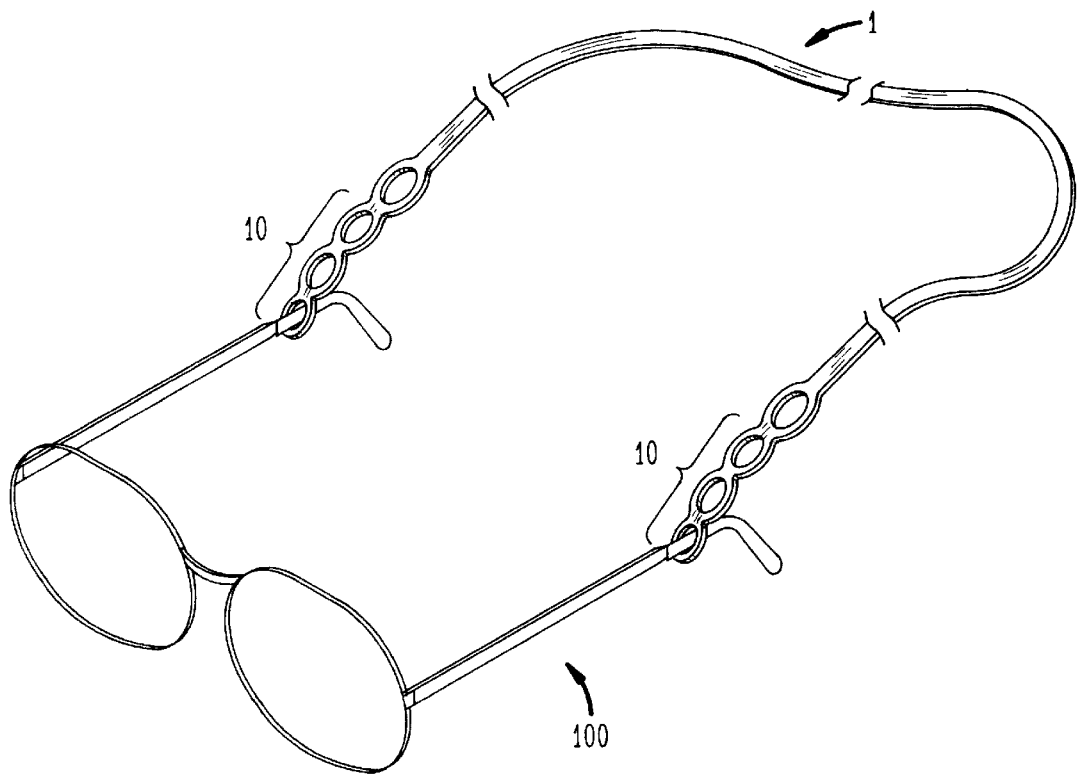
FIG. 6 is a fastening device being used with eyeglasses.

In its preferred embodiment, this invention is a fastening device or belt in the form of a strap 1 that can be produced by an automated molding process. The device 1 is fashioned from plastic molded in a desired shape. Because the plastic molding process is well known, widely available, and cost-effective, use of this process can produce a low-cost product having various designs and novel appearance details.

The strap 1 may be fabricated from many different plastics and elastomers. The preferred materials are polyurethane elastomers. Although these elastomers are available in many different formulations, the preferred formulation is a two-component urethane system that can be cured rapidly at moderate temperature (180° F. to 230° F.).

The strap 1 can also be made by use of a vinyl plastics. This is a single-component molding compound, which requires a cure temperature of about 350° F. for several minutes. Other plastics can also be used to produce this device.

At one end of the strap 1 are a plurality of hooking mechanisms 2. At the other end of the strap 1 are a plurality of receptor mechanisms 3. Preferably, the hooking mechanisms 2 and the receptor mechanisms 3 are identical to each other, both being a plurality of loops 10. Although the loops 10 may be of similar size, they are preferably of varying size. The shape of the loops 10 can be circles, ellipses, squares, rectangles, or similar configurations. The elastomer used to mold the strap 1 is preferably flexible enough that a loop 10 from one end can be bent or folded and then forced into a loop 10 on the other end. This action causes the loops 10 so engaged to interlock securely. The elastomer is also sufficiently rigid so that the interlocked loops 10 cannot readily be pulled apart. Thus, the preferred material for the strap 1 is a polyurethane elastomer with a Shore A2 durometer of approximately 90.

Figure 13:
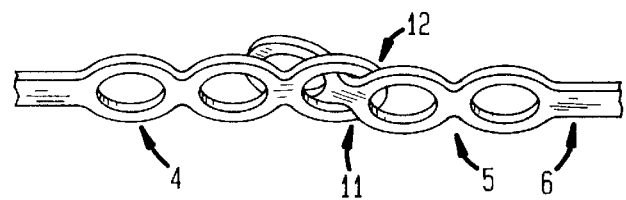
FIG. 13 is the area of interlocking of two separate fastening devices or belts to form a longer fastening device or belt.

Two straps 4, 5 may also be linked together to form a larger strap 6, as shown in FIG. 13. Such linking is accomplished as follows: A loop 11 at one end of the first strap 4 is interlocked with a loop 12 at one end of the second strap 5. Thus, one now has a larger strap 6 which is ready for use. Additional straps may be linked onto the larger strap 6 to produce an even longer strap.

The strap 1, or belt, has ends 2, 3 which can be securely locked together so that significant force is required to open the interlocked connection. The force needed for separation of the ends 2, 3 can be increased or decreased by, respectively, increasing or decreasing the number of loops that are interlocked. This interlocking avoids the need for a separate and relatively expensive buckle.

The strap 1 can also be used as a connector between two different objects, or to secure a specific object such as eyeglasses 100 around the head, a key 101, 102, or a whistle 103.

This invention is preferably produced by any of a number of different molding procedures, such as casting or injection molding. For casting, the preferable manufacturing process is an open-mold casting process.

The casting process uses an open casting mold 20 that can be produced by end milling or preferably, by photo-etching a magnesium or aluminum plate. The mold has two (2) grooves. One groove 21 will be filled resin (liquid elastomer) to form the strap 1. The other groove 22 provides a defined line so that the flash 15 along the cured, molded strap 1 can be easily and quickly removed.

The fabrication procedure is as follows: The two liquid components of the preferred liquid polyurethane elastomer system are mixed to form a liquid resin. The resin is then poured onto the surface of one end of the mold 20. A straight edge, or knife, is used to draw the resin across the mold 20 so that all the grooves 21, 22 are filled with the resin. The knife also removes excess resin from the exposed top surface of the mold, scraping this top surface clean. Next, the liquid resin is cured. After curing, the resin is peeled out of the grooves 21, 22 to obtain the molded product. Finally, the flash 15 is trimmed off the molded product to produce the final strap 1. Because the mold is open, the internal and external forces acting on the liquid resin will form the resin's exposed top surface into a flat configuration. Thus, the cured strap 1 will have one flat surface 4.

For injection molding, the mold is preferably made from tool steel. The mold contains an opening having two segments. The first segment comprises a flat surface that corresponds to the desired flat surface 4 of the strap 1. The second segment comprises a shape complementary to the contour of the remaining cross-section of the strap 1.

The fabrication process for the injection molding embodiment follows the well-known procedures for injection molding, described in many reference books such as Rubin, Irvin I., *Injection Molding: Theory and Practice* (John Wiley & Sons, Inc. 1972). In this case, a thermoplastic elastomer, preferably polyurethane in the form of pellets, is used. The pellets are melted in the injection molder and then injected into the injection mold, which is set at room temperature or at a temperature no more than 150° F. After a brief cooling cycle, the mold opens and the molded part is ejected from the mold by use of well-known ejection pins, producing the final strap 1. Because the mold cavity has one flat surface, one surface of the cooled elastomer will have a flat configuration. Thus, the produced strap 1 will have one flat surface 4.

Figure 11:
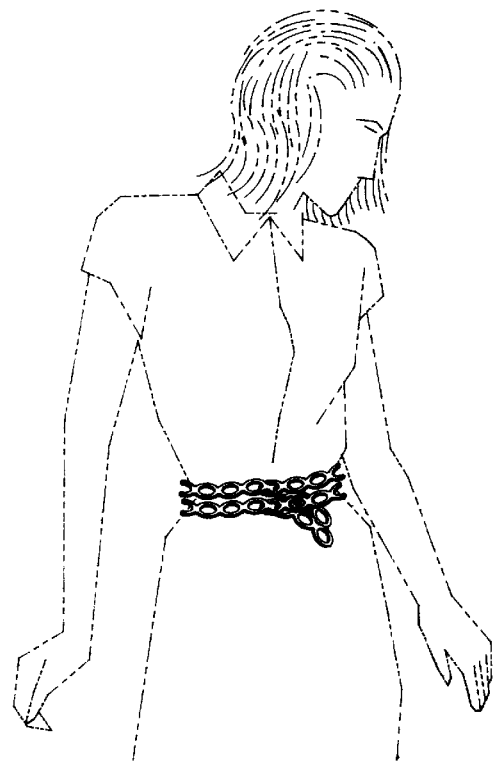
FIG. 11 is a double-stranded fastening device being used as a belt.
Figure 12:
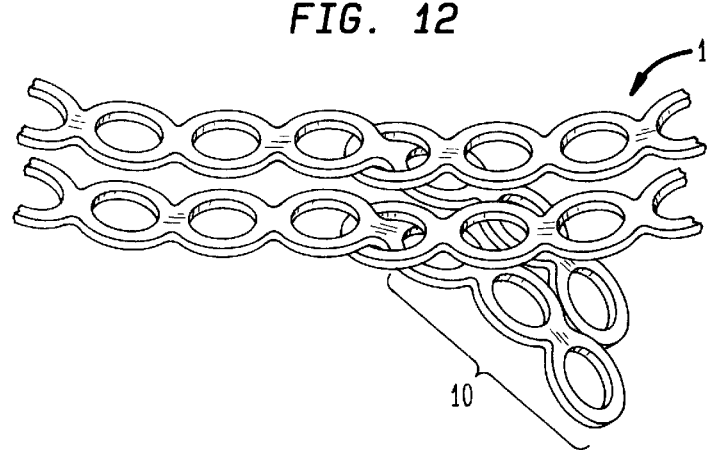
FIG. 12 is a section of the double-stranded fastening device shown in FIG. 11.

The strap 1 may be used as a belt, as shown in FIG. 11. In this use, the strap 1 is placed around the object to be secured, such as an article of clothing. Loops 10 at the ends 2, 3 are interlocked as discussed above. The strap 1 has now secured the object. The strap 1 is removed by reversing the loop interlocking process.

The strap 1 may also be used to grip objects, as noted above. Because the device preferably has varying size loops, it is versatile for gripping varying sizes and geometry of objects, such as eyeglasses 100, keys 101, 102, or whistles 103.

Figure 7:
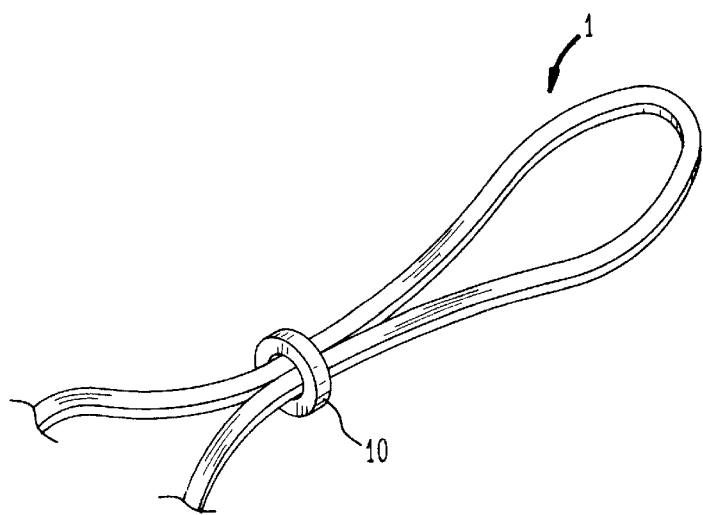
FIG. 7 is a section of the fastening device shown in FIG. 6 with its effective length reduced by use of a molded ring cut from an end loop of the fastening device.
Figure 8:
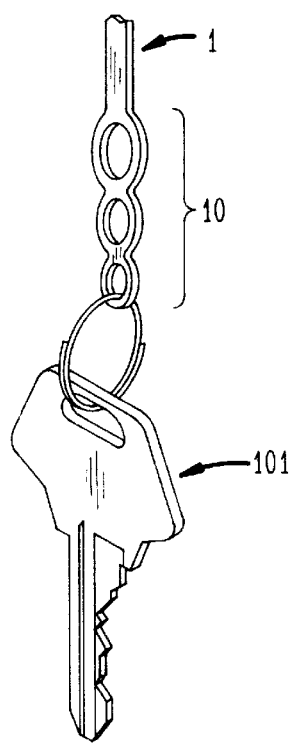
FIG. 8 is a section of a fastening device being used with a key.
Figure 9:
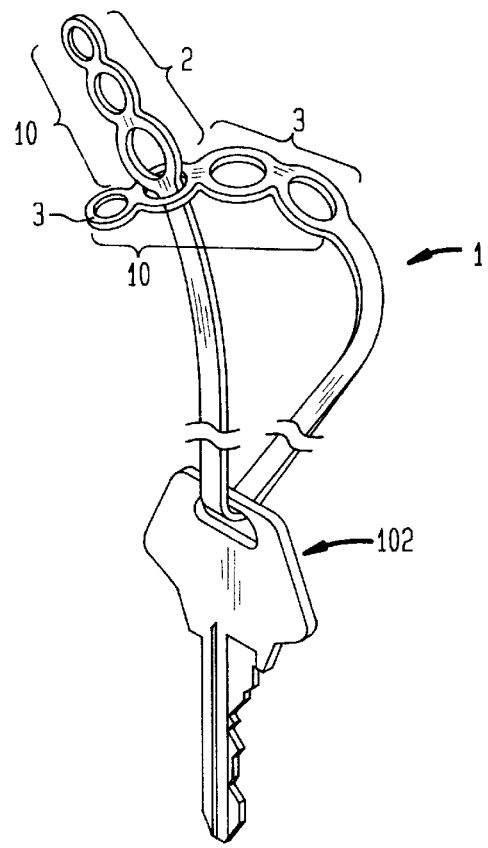
FIG. 9 is a fastening device being used with a key in a manner different than shown in FIG. 8.
Figure 10:
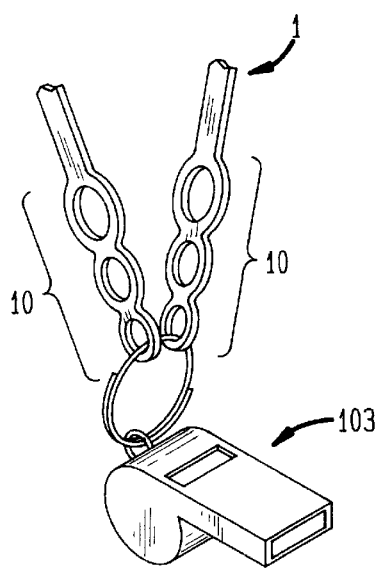
FIG. 10 is a section of a fastening device being used with a whistle.

Finally, the effective length of the strap 1 may be reduced by cutting off one of the loops 10, doubling over the strap at its middle, and threading the doubled strap through the broken-off loop. An example of this ability is shown in FIG. 7, where the strap 1 is used with eyeglasses 100 to secure the eyeglasses 100 during activities such as playing tennis or riding a horse.

Although this invention has been described with a certain degree of particularity, it is to be understood that the present disclosure has been made only by way of illustration and that numerous changes in the details of construction and arrangement of parts may be resorted to without departing from the spirit and scope of this invention. For example, the composition of the plastic may be chosen to allow for various industrial or household applications. Also, embossing or metallic pigments such as gold or silver may be used for an attractive cosmetic appearance.

I claim:

1. A fastening device comprising:

a strip having first and second identical ends and an extension length connecting said first and second ends;

said first end comprising a plurality of similar shaped first connector means; and said second end comprising a plurality of similar shaped second connector means;

said first connector means and said second connector means being interlockingly connectable with each other, and having complimentary structures such that said first connector means receive said second connector means, or said second connector means receive said first connector means, when an interlocking connection occurs with another said fastening device;

said first end having a first-end cross-section, said second end having a second-end cross-section, and said extension length having an extension length cross-section; said extension length cross-section being smaller than said first-end cross-section and said second-end cross-section;

said extension length comprising a side being flat and a second side being contoured;

said strip being fabricated from a high-strength plastic moldable material.

2. A fastening device as described in claim 1 wherein said first connector means comprises a plurality of circular shapes and said second connector means comprises a plurality of circular shapes.

3. A fastening device as described in claim 1 wherein said first connector means comprises a plurality of rectangular shapes and said second connector means comprises a plurality of rectangular shapes.

4. A fastening device as described in claim 1 wherein said first connector means comprises a plurality of shapes having different sizes said second connector means comprises a plurality of shapes having different sizes.

5. A fastening device as described in claim 1 wherein said plastic moldable material is castable.

6. A fastening device as described in claim 1 for holding eyeglasses.

7. A fastening device as described in claim 1 for holding keys.

8. A fastening device as described in claim 1 wherein said fastening device is removably connected to another said fastening device.

9. A fastening device as described in claim 1 wherein:

said first connector means is identical to said second connector means; and said plastic moldable material comprises polyurethane.

* * * * *